(12) United States Patent
Lu (10) Patent No.: US 9,721,054 B2
(45) Date of Patent: Aug. 1, 2017

(54) BUILDING A CORNER MODEL OF INTERCONNECT WIRE RESISTANCE

(71) Applicant: International Business Machines Corporation, Armonk, NY (US)

(72) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,140

(22) Filed: Dec. 11, 2015

(65) Prior Publication Data

US 2017/0169157 A1    Jun. 15, 2017

(51) Int. Cl.
G06F 17/50    (2006.01)

(52) U.S. Cl.
CPC ...... *G06F 17/5077* (2013.01); *G06F 2217/10* (2013.01)

(58) Field of Classification Search
CPC .................. G06F 17/5077; G06F 2217/10
USPC ....................................................... 716/130
See application file for complete search history.

(56) References Cited

U.S. PATENT DOCUMENTS

| | | | | |
|---|---|---|---|---|
| 5,838,582 A * | 11/1998 | Mehrotra | ............ | G06F 17/5081 716/115 |
| 6,061,508 A | 5/2000 | Mehrotra et al. | | |
| 6,901,570 B2 | 5/2005 | Lu | | |
| 7,861,195 B2 * | 12/2010 | Chan | ................... | G06F 17/5081 430/30 |
| 8,204,714 B2 * | 6/2012 | Lu | ........................... | G06F 17/18 702/179 |
| 8,375,346 B2 | 2/2013 | Sode | | |
| 9,104,834 B2 | 8/2015 | Bickford et al. | | |
| 9,361,424 B2 * | 6/2016 | Robles | ................ | G06F 17/5022 |
| 2002/0077798 A1 | 6/2002 | Inoue et al. | | |
| 2009/0228854 A1 | 9/2009 | Sakamoto | | |
| 2015/0302134 A1 | 10/2015 | Berkens | | |

FOREIGN PATENT DOCUMENTS

CN    103136400 A    6/2013

OTHER PUBLICATIONS

IBM, "Efficient Method of Modeling Global Interconnect on Chip Variation (OCV) in Statistical Static Timing Analysis (SSTA)", Nov. 14, 2008, pp. 1-3, Ip.com, United States.

* cited by examiner

*Primary Examiner* — Jack Chiang
*Assistant Examiner* — Brandon Bowers
(74) *Attorney, Agent, or Firm* — Sherman IP LLP; Kenneth L. Sherman; Hemavathy Perumal (57) ABSTRACT

One embodiment provides a method of building a wire resistance corner model for an interconnect metal level in a semiconductor device. The method comprises determining nominal on-wafer widths and wire thicknesses at minimum and maximum design widths of the interconnect metal level, and determining standard deviations for global variations in on-wafer width and wire thickness. The method further comprises determining maximum and minimum statistical corner values for interconnect wire resistance. A first corner solution that minimizes a maximum absolute difference between a model corner value and a statistical corner value of the maximum statistical corner values is computed. A second corner solution that minimizes a maximum absolute difference between a model corner value and a statistical corner value of the minimum statistical corner values is computed.

20 Claims, 8 Drawing Sheets

BUILDING A CORNER MODEL OF INTERCONNECT WIRE RESISTANCE

The present invention generally relates to interconnect wire resistance, and more particularly, building a corner model of interconnect wire resistance.

BACKGROUND

A set of compact device models for a semiconductor technology typically includes a set of field-effect transistor (FET) device models, one or more passive device models (e.g., resistors, capacitors, inductors, etc.), and one or more interconnect models. Each model within the set of compact device models comprises nominal values of various process and/or model parameters as well as corresponding statistical variations. For example, typical model parameters for an interconnect model (i.e., wire) of a semiconductor technology includes wire length, wire width, wire thickness, etc., and the interconnect model returns wire resistance based on wire width and wire length as well as an index for a given interconnect level. By running a Monte Carlo simulation, which is typically time consuming, a distribution of wire resistance can also be obtained for a given wire width, and a minimum resistance bound and a maximum resistance bound for the given wire width can also be obtained. To reduce simulation time, often a set of corner models are developed. A corner model allows a single corner simulation run to obtain a minimum or maximum resistance value for a given wire width.

SUMMARY

One embodiment provides a method of building a wire resistance corner model for an interconnect metal level in a semiconductor device. For all allowed design wire widths for the interconnect metal level, the method provides a first single corner model for maximum resistance corner for interconnect wire resistance, and a second single corner model for minimum resistance corner for interconnect wire resistance. Specifically, the method comprises determining a first nominal on-wafer width and a first nominal wire thickness at a minimum design width of the interconnect metal level. The method further comprises determining a second nominal on-wafer width and a second nominal wire thickness at a maximum design width of the interconnect metal level. A first standard deviation for global variations in wire thickness, and a second standard deviation for global variations in on-wafer width are determined. A relation between resistance of the interconnect metal level and on-wafer width and thickness of the interconnect metal level is determined. The method further comprises determining a set of maximum statistical corner values and a set of minimum statistical corner values for interconnect wire resistance. A first corner solution that minimizes a first maximum absolute difference between a first model corner value and a first statistical corner value of the set of maximum statistical corner values in a range of the minimum design width and the maximum design width is computed. A second corner solution that minimizes a second maximum absolute difference between a second model corner value and a second statistical corner value of the set of minimum statistical corner values in the range of the minimum design width and the maximum design width is computed.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to interconnect wire resistance, and more particularly, building a corner model of interconnect wire resistance. One embodiment provides a method of building a wire resistance corner model for an interconnect metal level in a semiconductor device. For all allowed design wire widths for the interconnect metal level, the method provides a first single corner model for maximum resistance corner for interconnect wire resistance, and a second single corner model for minimum resistance corner for interconnect wire resistance. Specifically, the method comprises determining a first nominal on-wafer width and a first nominal wire thickness at a minimum design width of the interconnect metal level. The method further comprises determining a second nominal on-wafer width and a second nominal wire thickness at a maximum design width of the interconnect metal level. A first standard deviation for global variations in wire thickness, and a second standard deviation for global variations in on-wafer width are determined. A relation between resistance of the interconnect metal level and on-wafer width and thickness of the interconnect metal level is determined. The method further comprises determining a set of maximum statistical corner values and a set of minimum statistical corner values for interconnect wire resistance. A first corner solution that minimizes a first maximum absolute difference between a first model corner value and a first statistical corner value of the set of maximum statistical corner values in a range of the minimum design width and the maximum design width is computed. A second corner solution that minimizes a second maximum absolute difference between a second model corner value and a second statistical corner value of the set of minimum statistical corner values in the range of the minimum design width and the maximum design width is computed.

In this specification, the term "global variations" as used herein represents global/correlated geometric variations in a cross-sectional area of a wire that result from semiconductor manufacturing process; we assume a same amount of global/correlated variations in wire width for different wires of different wire widths. A model of interconnect wire resistance should only have one set of corner values for different wires of different wire widths for an interconnect metal level in a semiconductor device.

Table 1 below identifies different parameters/variables referenced in this specification.

TABLE 1

| Parameters/Variables | Definition |
|---|---|
| n | A positive integer value (e.g., 1, 2 or 3) or a positive real value |
| R | Interconnect wire resistance |
| $R_0$ or $\langle R \rangle$ | Average or mean value for interconnect wire resistance |
| $R_{min}$ | $n\sigma$ lower bound value for interconnect wire resistance |
| $R_{max}$ | $n\sigma$ upper bound value for interconnect wire resistance |
| $R_c$ | A corner value for interconnect wire resistance |
| $\sigma_R$ | Standard deviation for interconnect wire resistance |
| w | Wire's nominal on-wafer width at half height |
| t | Nominal wire thickness. The thickness t is a constant or a weak function of width w. |
| $\Delta w$ | Difference between on-wafer width ("actual width") on a particular chip and corresponding nominal on-wafer width |
| $\Delta t$ | Difference between wire thickness ("actual thickness") on a particular chip and corresponding nominal wire thickness |
| $\sigma_w$ | Standard deviation for global/correlated variations in on-wafer width |
| $\sigma_t$ | Standard deviation for global/correlated variations in wire thickness |
| L | Length of a wire ("wire length"); wire length is substantially larger than wire width, such that any variation in wire length can be ignored |
| $\rho$ | Resistivity of a wire. The resistivity $\rho$ is a constant or a weak function of both width w and thickness t [i.e., $\rho = \rho(w, t)$] |
| $W_{design}$ | Wire's design width |
| $w_{bias}$ | A constant value or substantially close to being a constant value |

A nominal on-wafer width w may be expressed in accordance with equation (1a) provided below:

$$w = W_{design} + w_{bias}(W_{design}),\qquad(1a)$$

wherein the relation $w_{bias}(W_{design})$ is known. For example, a minimum design width $w_{min}$ may be expressed in accordance with equation (1b) provided below:

$$w_{min} = W_{design,min} + w_{bias}(W_{design,min}),\qquad(1b)$$

and a maximum design width $w_{max}$ may be expressed in accordance with equation (1c) provided below:

$$w_{max} = W_{design,max} + w_{bias}(W_{design,max}).\qquad(1c)$$

Figure 1:
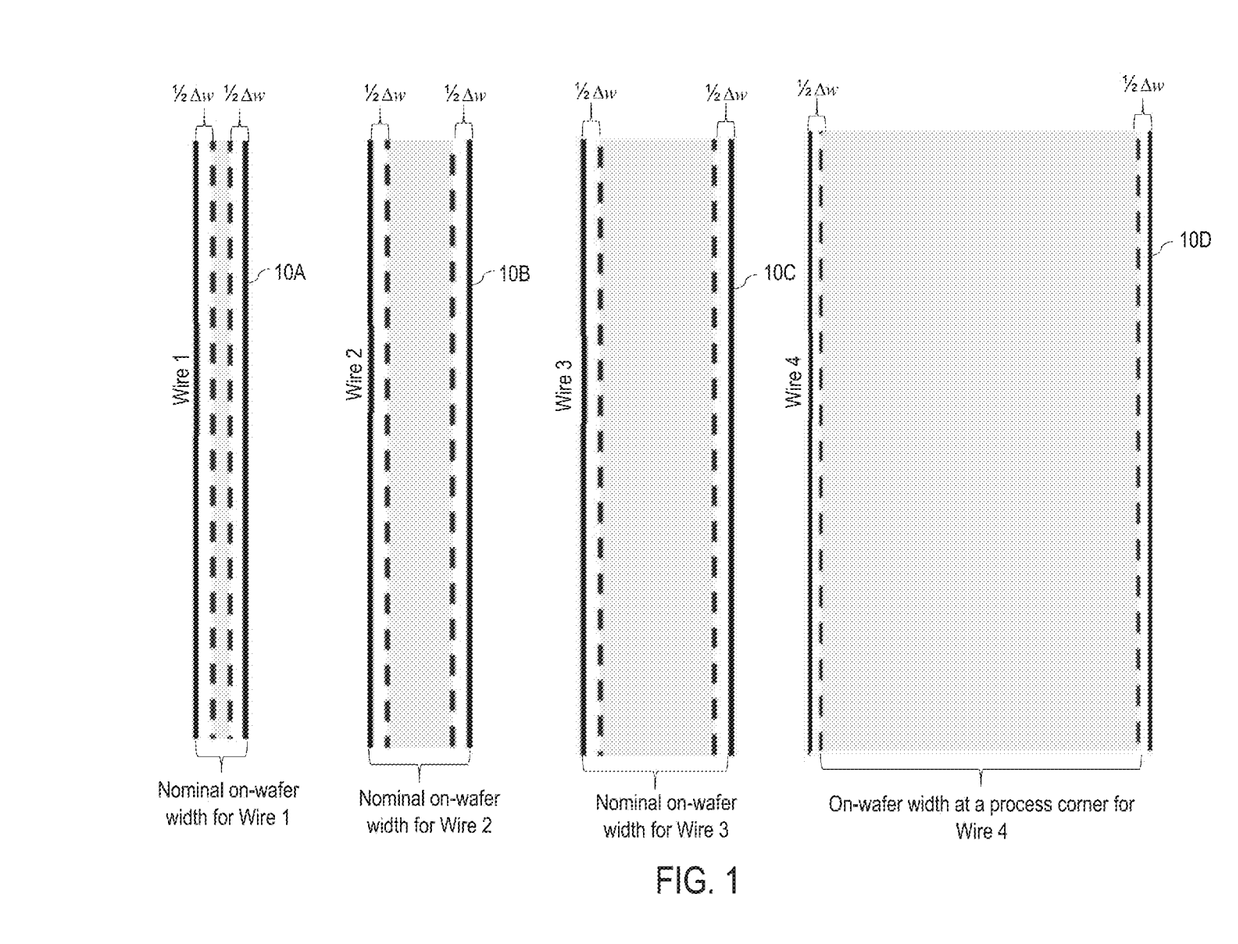
FIG. 1 illustrates interconnect wires of different widths.

FIG. 1 illustrates interconnect wires of different widths. Specifically, FIG. 1 illustrates a first wire 10A ("Wire 1"), a second wire 10B ("Wire 2"), a third wire 10C ("Wire 3"), and a fourth wire 10D ("Wire 4"). Even though the wires in FIG. 1 have different wire widths, differences $\Delta w$ (shown in FIG. 1) and $\Delta t$ (not shown in FIG. 1) are the same for each wire shown.

Conventionally, based on nominal and tolerance values of model parameters, a circuit designer runs multiple Monte Carlo simulations for a single circuit to determine (1) nominal performance value of the circuit, (2) an $n\sigma$ (e.g., $3\sigma$, etc.) worst-case performance, and (3) an $n\sigma$ (e.g., $3\sigma$, etc.) best-case performance of the circuit (e.g., based on the wire resistance distribution obtained from the Monte Carlo simulations). As the Monte Carlo model for interconnect wire resistance R requires hundreds or even thousands of simulation runs to estimate $n\sigma$ resistance corner values, large amounts of central processing unit (CPU) time is consumed (i.e., running Monte Carlo simulations is CPU intensive).

The Monte Carlo model for interconnect wire resistance R is represented in accordance with equation (2) provided below:

$$R = \frac{L\rho}{(w+\Delta w)(t+\Delta t)} \approx R_0 + (\Delta w)\frac{\partial R}{\partial w} + (\Delta t)\frac{\partial R}{\partial t} \approx R_0\left(1 - \frac{\Delta w}{w} - \frac{\Delta t}{t}\right) = R_0\left(1 - \frac{\sigma_w u_1}{w} - \frac{\delta_t u_2}{t}\right), \quad (2)$$

wherein $u_1$ and $u_2$ denote normalized independent random variables, and the normalized random variables $u_1$ and $u_2$ satisfy equations (3)-(5) provided below:

$$\langle u_1 \rangle = \langle u_2 \rangle = 0, \quad (3)$$

$$\langle u_1^2 \rangle = \langle u_2^2 \rangle = 1, \quad (4)$$

and $$\langle u_1 u_2 \rangle = 0. \quad (5)$$

A mean $\langle R \rangle$ for interconnect wire resistance R is computed in accordance with equation (6) provided below:

$$\langle R \rangle = R_0 = \frac{L\rho}{wt}. \quad (6)$$

A standard deviation $\sigma_R$ for interconnect wire resistance R is computed in accordance with equation (7a) provided below:

$$\sigma_R = \langle (R-R_0)^2 \rangle^{1/2} = \sqrt{\left(\sigma_w \frac{\partial R}{\partial w}\right)^2 + \left(\sigma_t \frac{\partial R}{\partial t}\right)^2} \approx R_0 S, \quad (7a)$$

with $$S \equiv \sqrt{\left(\frac{\sigma_w}{w}\right)^2 + \left(\frac{\sigma_t}{t}\right)^2}. \quad (7b)$$

$3\sigma$ resistance corner values are computed in accordance with equations (8)-(9) provided below:

$$R_{min} = R_0 - 3\sigma_R, \quad (8)$$

and $$R_{max} = R_0 + 3\sigma_R, \quad (9)$$

wherein the $3\sigma$ resistance range $[R_{min}, R_{max}]$ covers 99.73% of the wire resistance distribution, from 0.135% percentile to 99.865% percentile of probability.

Alternatively, based on nominal and tolerance values of model parameters, a circuit designer runs one or two corner model simulations to estimate $n\sigma$ resistance corner values for a single wire width w.

The corner model for interconnect wire resistance R is represented in accordance with equation (10) provided below:

$$R_c = R_0 + \sigma_w u_{1c}\frac{\partial R}{\partial w} + \sigma_t u_{2c}\frac{\partial R}{\partial t} \approx R_0\left(1 - \frac{\sigma_w u_{1c}}{w} - \frac{\sigma_t u_{2c}}{t}\right), \quad (10)$$

wherein $u_{1c}$ and $u_{2c}$ denote corner values for wire width w and thickness t, respectively.

For a single given wire width, there are two optimal corners—one is for a minimum resistance corner, and the other is for a maximum resistance corner. The two optimal corners satisfy equations (11)-(12) provided below:

For $3\sigma$ minimum resistance corner:

$$u_{1c} = u_{1c,minR} = 3\frac{\sigma_w}{wS}, \quad u_{2c} = u_{2c,minR} = 3\frac{\sigma_t}{tS}; \quad (11)$$

For $3\sigma$ maximum resistance corner:

$$u_{1c} = u_{1c,maxR} = -3\frac{\sigma_w}{wS}, \quad u_{2c} = u_{2c,maxR} = -3\frac{\sigma_t}{tS}; \quad (12)$$

Since the parameter S is a function of wire width w [see equation (7b)], corner values ($u_{1c,minR}$, $u_{2c,minR}$) in equation (11) for the minimum wire resistance vary with design width w, and so do corner values ($u_{1c,maxR}$, $u_{2c,maxR}$) in equation (12). On a semiconductor chip, there are three or more wire widths at a given interconnect level.

Using which wire width w to set corner values is an unsolved problem so far. A common minimum resistance corner ($u_{1c,minR}$, $u_{2c,minR}$) for all wire widths simultaneously is needed. Similarly, another common maximum resistance corner ($u_{1c,minR}$, $u_{2c,minR}$) for all wire widths simultaneously is also needed. To set $3\sigma$ resistance corner values for two wire widths simultaneously, there exists a different corner solution (since there are two variables to satisfy two target resistance values). There is, however, no exact corner solution for three wire widths simultaneously (since two variables cannot satisfy three target resistance values in general). Embodiments of the invention provide a corner solution for three wire widths simultaneously.

Figure 2:
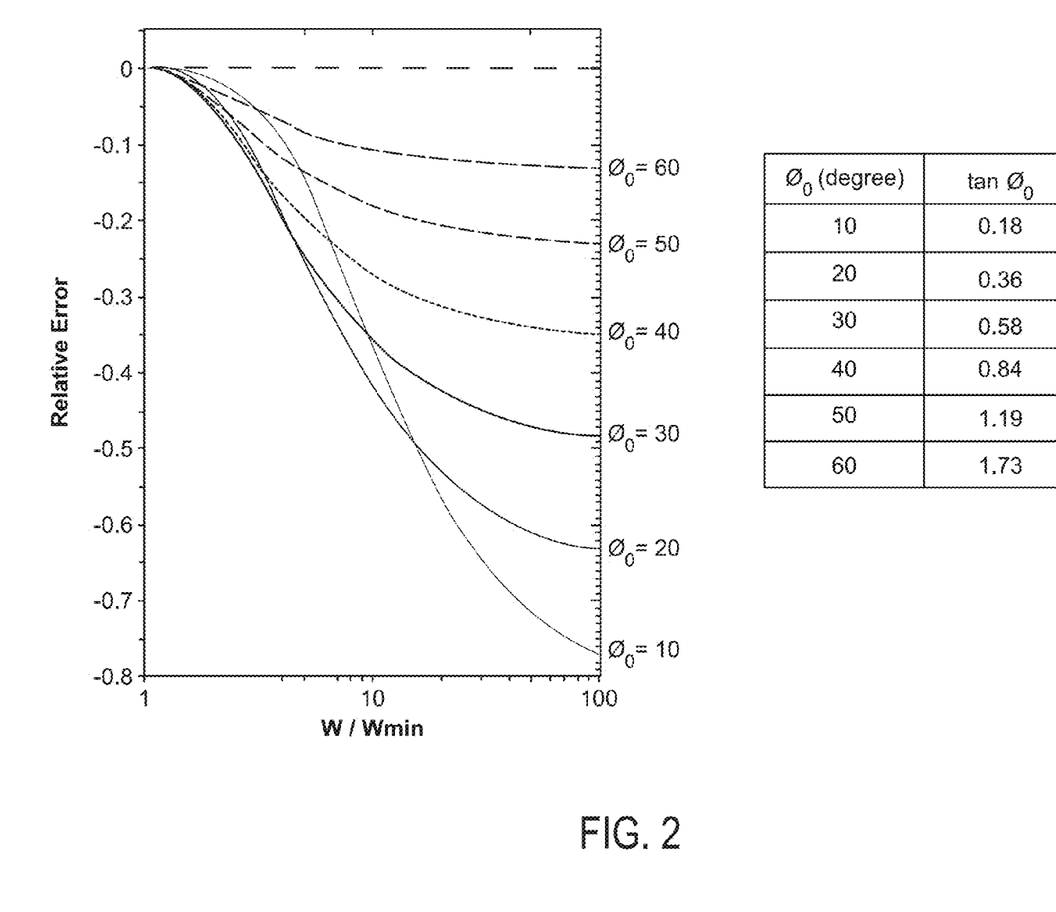
FIG. 2 is a graph illustrating relative error of model corner value compared to statistical corner value when optimal 3σ resistance corner model for minimum design wire width $w_{min}$ is applied to all wire widths.

FIG. 2 is a graph illustrating relative error of model corner value compared to statistical corner value when optimal $3\sigma$ resistance corner model for minimum design width $w_{min}$ is applied to all wire widths. As shown in FIG. 2, relative error increases as ratio of $w/w_{min}$ increases; the relative error may exceed 20%, 30%, 40%, 50%, etc.

In FIG. 2, $\tan \phi_0$ is defined in equation (13) below:

$$\tan\phi_0 = \frac{\sigma_t \frac{\partial R}{\partial t}\big|_{w=w_{min}}}{\sigma_w \frac{\partial R}{\partial w}\big|_{w=w_{min}}} \approx \frac{\sigma_t/t(w_{min})}{\delta_w/w_{min}}. \quad (13)$$

Embodiments of the invention provide a method and system for setting $n\sigma$ resistance corner values for three or more wire widths simultaneously.

Figure 3:
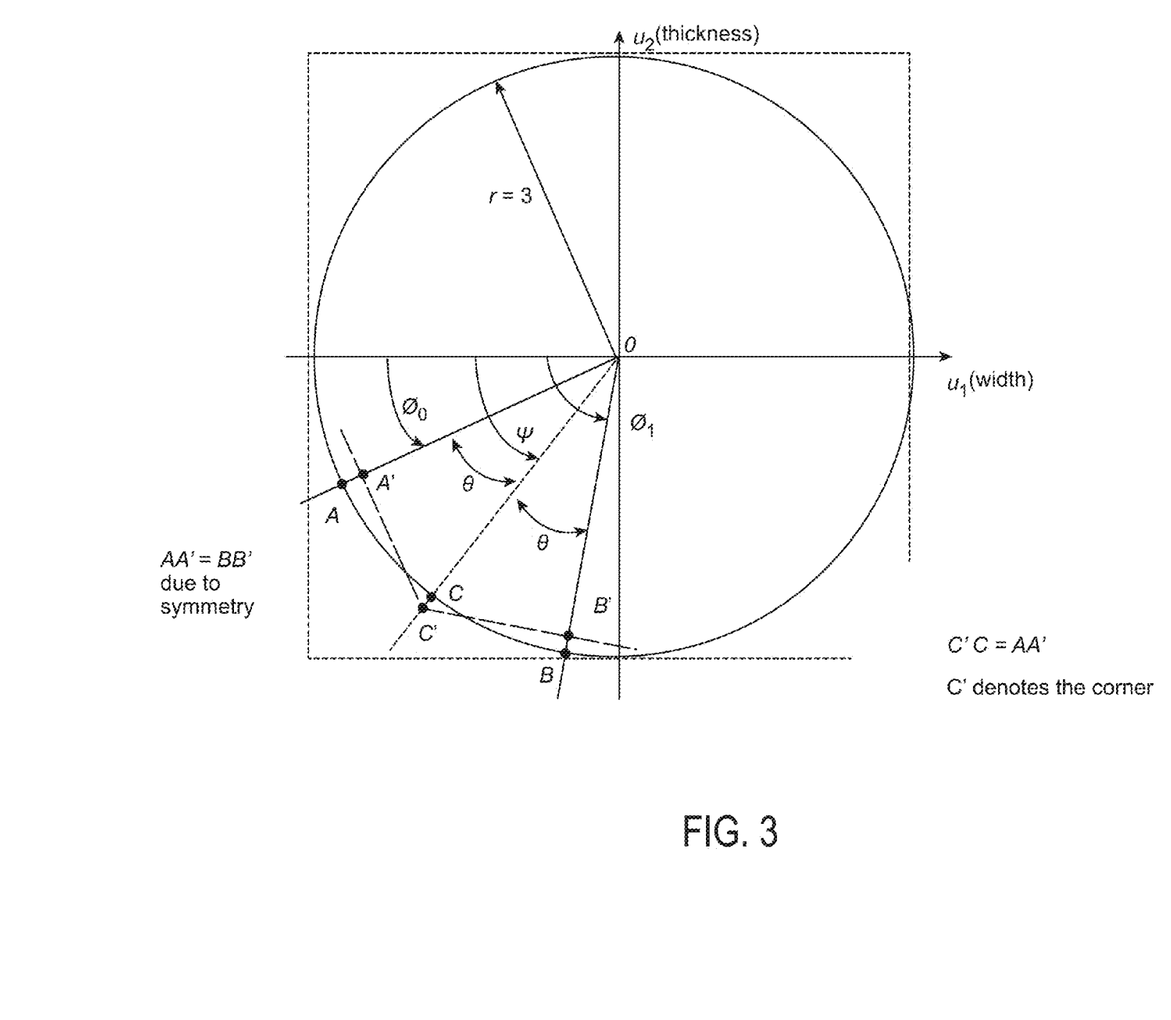
FIG. 3 illustrates a geometric representation of variables (including variations in wire width and wire thickness) used in determining nσ resistance corner values for three or more wire widths, in accordance with an embodiment.
Figure 4:
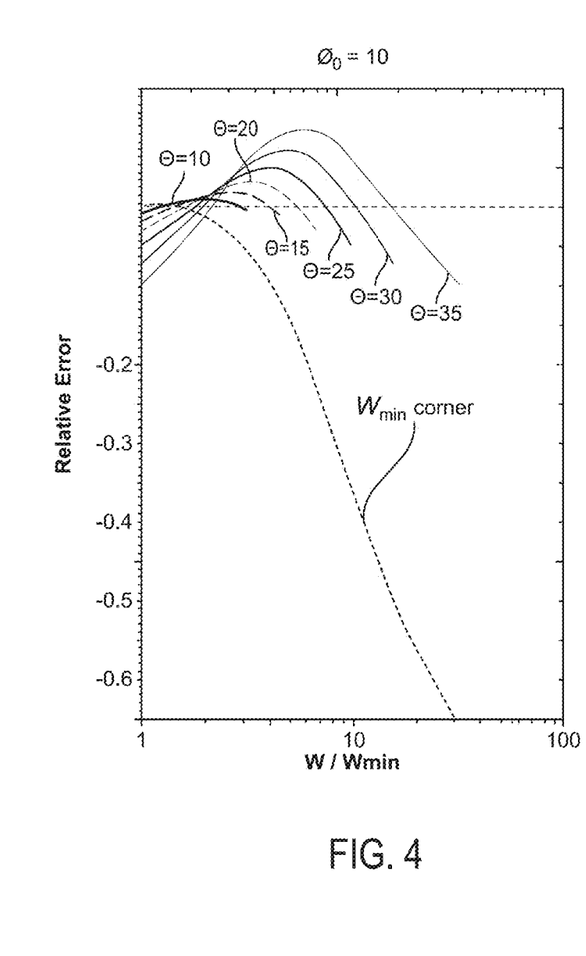
FIG. 4 is a first graph corresponding to a first $\phi_0$ value, the first graph including one curve labeled as "$w_{min}$ corner" showing relative error of model corner value compared to statistical corner value when optimal 3σ resistance corner model for minimum design wire width $w_{min}$ is applied to all wire widths, and additional curves showing relative error of model corner value compared to statistical corner value when an embodiment of the invention is applied.
Figure 5:
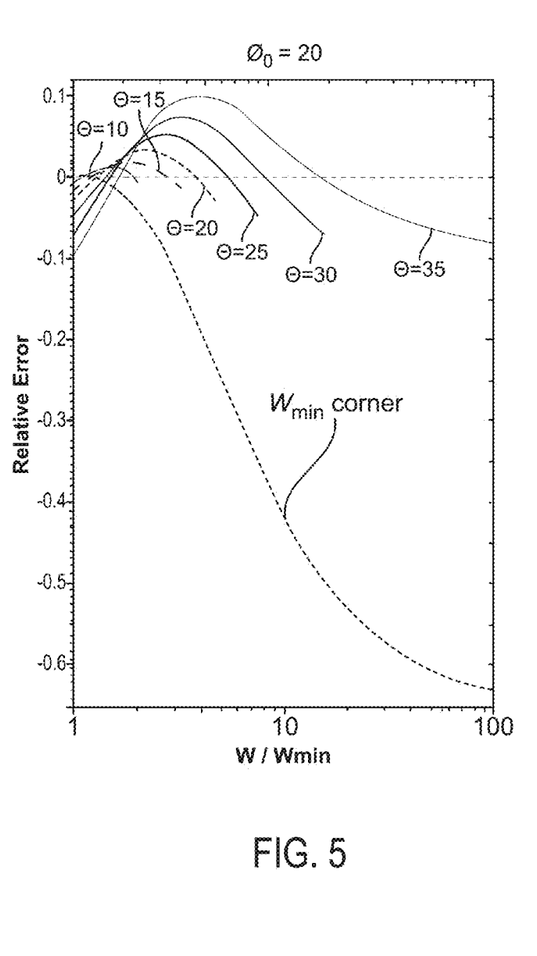
FIG. 5 is a second graph corresponding to a second $\phi_0$ value, the second graph including one curve labeled as "$w_{min}$ corner" showing relative error of model corner value compared to statistical corner value when optimal 3σ resistance corner model for minimum design wire width $w_{min}$ is applied to all wire widths, and additional curves showing relative error of model corner value compared to statistical corner value when an embodiment of the invention is applied.
Figure 6:
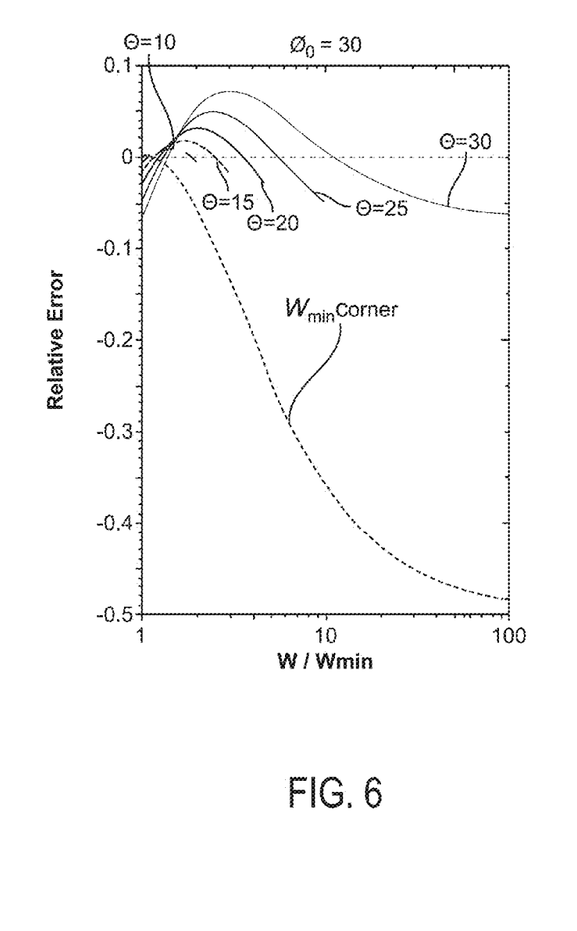
FIG. 6 is a third graph corresponding to a third $\phi_0$ value, the third graph including one curve labeled as "$w_{min}$ corner" showing relative error of model corner value compared to statistical corner value when optimal 3σ resistance corner model for minimum design wire width $w_{min}$ is applied to all wire widths, and additional curves showing relative error of model corner value compared to statistical corner value when an embodiment of the invention is applied.
Figure 7:
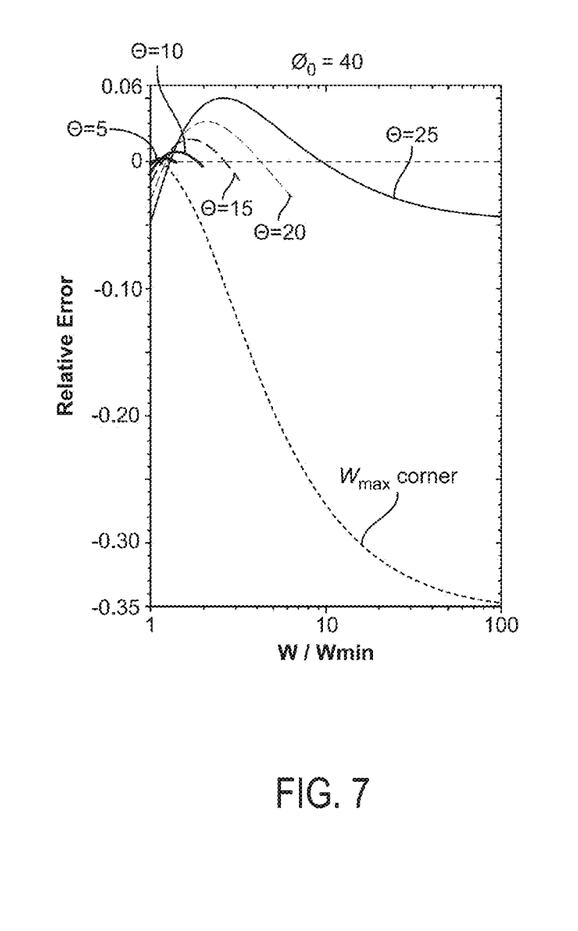
FIG. 7 is a fourth graph corresponding to a fourth $\phi_0$ value, the fourth graph including one curve labeled as "$w_{min}$ corner" showing relative error of model corner value compared to statistical corner value when optimal 3σ resistance corner model for minimum design wire width $w_{min}$ is applied to all wire widths, and additional curves showing relative error of model corner value compared to statistical corner value when an embodiment of the invention is applied.
Figure 8:
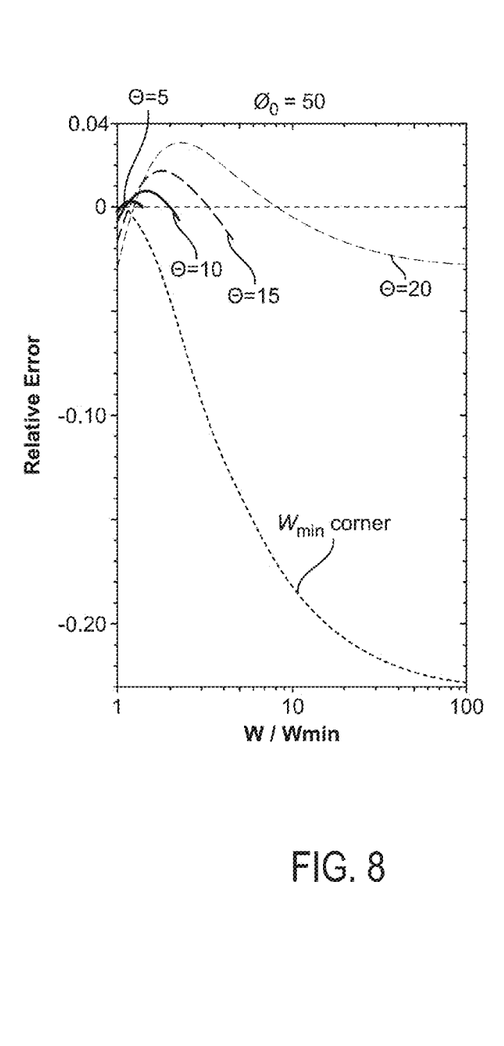
FIG. 8 is a fifth graph corresponding to a fifth $\phi_0$ value, the fifth graph including one curve labeled as "$w_{min}$ corner" showing relative error of model corner value compared to statistical corner value when optimal 3σ resistance corner model for minimum design wire width $w_{min}$ is applied to all wire widths, and additional curves showing relative error of model corner value compared to statistical corner value when an embodiment of the invention is applied.
Figure 9:
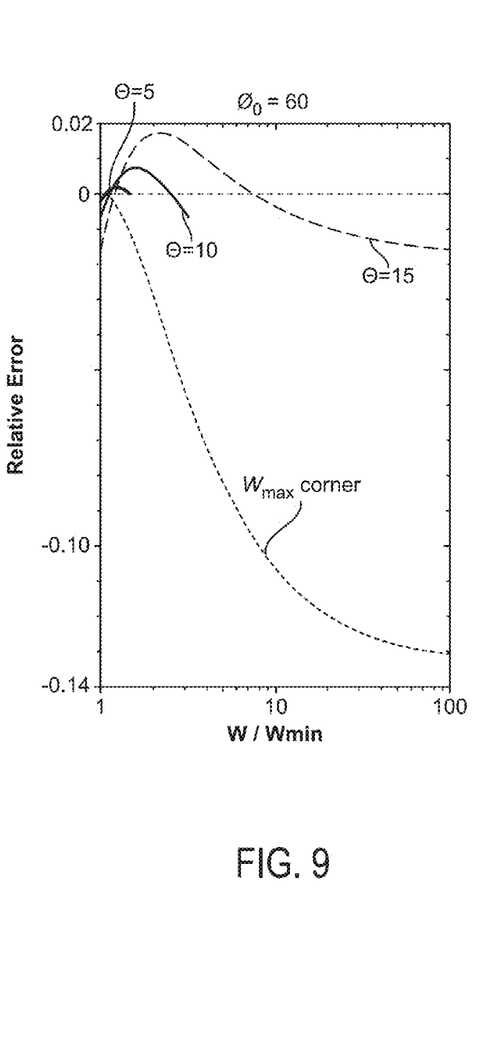
FIG. 9 is a sixth graph corresponding to a sixth $\phi_0$ value, the sixth graph including one curve labeled as "$w_{min}$ corner" showing relative error of model corner value compared to statistical corner value when optimal $3\sigma$ resistance corner model for minimum design wire width $w_{min}$ is applied to all wire widths, and additional curves showing relative error of model corner value compared to statistical corner value when an embodiment of the invention is applied.

FIG. 3 illustrates a geometric representation of variables (including variations in wire width and wire thickness) used in determining $n\sigma$ resistance corner values for three or more wire widths, in accordance with an embodiment. Wire thickness t is either a constant or a weak function of wire width. The value n as used in $n\sigma$ is a positive value. The value n can be a positive integer (e.g., 1, 2, or 3) or a positive real value. For example, between $2\sigma$ minimum resistance corner and $2\sigma$ maximum resistance corner, there is ~95% probability (from 2.5% percentile to 97.5% percentile). When n=2.326, it covers 98% probability, from 1% percentile to 99% percentile of probability. When n=1.645, it covers 90% probability, from 5% percentile to 95% percentile of probability. When n=1.281, it covers 80% probability, from 10% percentile to 90% percentile of probability.

nσ resistance corner values for three or more wire widths are determined as follows: First, for each interconnect metal level in a semiconductor device, a minimum wire width $w_{min}$ and a maximum wire width $w_{max}$ are identified for the interconnect metal level, wherein $[w_{min}, w_{max}]$ denotes an allowed design width range.

Second, for each interconnect metal level in the semiconductor device, determine nσ maximum corner values for interconnect wire resistance R. The nσ maximum corner values correspond to a first percentile of probability (e.g., 99.865%, 99%, 97.5%, 95%, or 90%). The nσ maximum corner values include an nσ maximum model corner value and an nσ maximum statistical corner value for interconnect wire resistance R.

Third, for each interconnect metal level in the semiconductor device, determine nσ minimum corner values for interconnect wire resistance R. The nσ minimum corner values correspond to a second percentile of probability (e.g., 0.135%, 1%, 2.5%, 5%, or 10%). The nσ minimum corner values include an nσ minimum model corner value and an nσ minimum statistical corner value for interconnect wire resistance R.

Fourth, for each interconnect metal level in the semiconductor device, compute a first single corner solution (i.e., $u_{1c,minR}$ and $u_{2c,minR}$) for all wire widths that minimizes a first absolute difference $\Delta R_1$, wherein the first absolute difference $\Delta R_1$ represents a maximum absolute difference between the nσ maximum model corner value and the nσ maximum statistical corner value for interconnect wire resistance R in the allowed design width range $[w_{min}, w_{max}]$. The absolute difference $\Delta R_1$ is expressed in accordance with equation (14) provided below:

$$\Delta R_1 = |R(n\sigma \text{ max model corner value}) - R(n\sigma \text{ max statistical corner value})|/(n\sigma). \tag{14}$$

An embodiment disclosed here minimizes the maximum value of $\Delta R_1$ within the allowed design width range $[w_{min}, w_{max}]$. Assume point C' in FIG. 3 is an example corner solution. The coordinates of point C' are denoted as ($u_{1c}$, $u_{2c}$). As illustrated in FIG. 3, the coordinates $u_{1c}$ and $u_{2c}$ are computed in accordance with equation (15) provided below:

$$u_{1c} = -nL \cos \psi, \ u_{2c} = -nL \sin \psi, \tag{15}$$

wherein n=3 in FIG. 3, and n satisfies condition (16) provided below:

$$nL = OC'. \tag{16}$$

Minimizing the maximum value of $\Delta R_1$ within the allowed design width range $[w_{min}, w_{max}]$ is equivalent to minimizing the maximum value of $\Delta R_1$ within the angle range $[\phi_0, \phi_1]$ in FIG. 3. For example, relation $$C'C = AA' \tag{17}$$

in FIG. 3 is chosen as the corner solution. FIG. 3 shows equations (18)-(19) provided below $$C'C = C'O - CO = nL - n, \tag{18}$$

$$AA' = AO - A'O = n - nL \cos \theta. \tag{19}$$

Thus, the value of L is obtained after substituting equations (18) and (19) into equation (17), as shown in equation (20) provided below:

$$L = \frac{2}{1 + \cos \theta} = \frac{1}{\cos^2 \frac{1}{2}\theta}. \tag{20}$$

Fifth, for each interconnect metal level in the semiconductor device, compute a second single corner solution (i.e., $u_{1c,minR}$ and $u_{2c,minR}$) for all wire widths that minimizes a second absolute difference $\Delta R_2$, wherein the second absolute difference $\Delta R_2$ represents a maximum absolute difference between the nσ minimum model corner value and the nσ minimum statistical corner value for interconnect wire resistance R in the allowed design width range $[w_{min}, w_{max}]$. The absolute difference $\Delta R_2$ is expressed in accordance with equation (21) provided below:

$$\Delta R_2 = |R(n\sigma \text{ min model corner value}) - R(n\sigma \text{ min statistical corner value})|/(n\sigma). \tag{21}$$

A similar corner solution also minimizes the maximum value of $\Delta R_2$ within the allowed design width range $[w_{min}, w_{max}]$ is determined using equation (22) provided below:

$$u_{1c} = nL \cos \psi, \ u_{2c} = nL \sin \psi, \tag{22}$$

wherein the value of L is obtained using equation (20) provided above.

To summarize, $u_{1c}$ and $u_{2c}$, for use in the corner model for interconnect wire resistance R as expressed in equation (10) above, are computed in accordance with equations (23)-(28) provided below:

$$\phi_0 = \arctan \frac{\sigma_t \frac{\partial R}{\partial t}\big|_{w=w_{min}}}{\sigma_w \frac{\partial R}{\partial w}\big|_{w=w_{min}}} \approx \arctan \frac{\sigma_t w_{min}}{t(w_{min})\sigma_w}, \tag{23}$$

$$\phi_1 = \arctan \frac{\sigma_t \frac{\partial R}{\partial t}\big|_{w=w_{max}}}{\sigma_w \frac{\partial R}{\partial w}\big|_{w=w_{max}}} \approx \arctan \frac{\sigma_t w_{max}}{t(w_{max})\sigma_w}, \tag{24}$$

$$\psi = \frac{1}{2}(\phi_0 + \phi_1), \tag{25}$$

$$\theta = \frac{1}{2}(\phi_1 - \phi_0), \tag{26}$$

$$u_{1c} = u_{1c,minR} = \frac{n \cos \psi}{\cos^2 \frac{1}{2}\theta}, \ u_{1c} = u_{1c,maxR} = -\frac{n \cos \psi}{\cos^2 \frac{1}{2}\theta}, \tag{27}$$

$$u_{2c} = u_{2c,minR} = \frac{n \sin \psi}{\cos^2 \frac{1}{2}\theta}, \ u_{2c} = u_{2c,maxR} = -\frac{n \sin \psi}{\cos^2 \frac{1}{2}\theta}, \tag{28}$$

wherein $u_{1c,minR}$ and $u_{2c,minR}$ denote nσ minimum corner values used for all (three or more) wire widths in the range $[w_{min}, w_{max}]$, and $u_{1c,maxR}$ and $u_{2c,maxR}$ denote nσ maximum resistance corner values used for all (three or more) wire widths in the range $[w_{min}, w_{max}]$. The ranges of angles satisfy conditions (29)-(30) provided below:

$$0 < \phi_1 < \psi < \phi_2 \leq \frac{1}{2}\pi, \tag{29}$$

and $$0 < \theta < \frac{1}{4}\pi. \tag{30}$$

FIGS. 4-9 are graphs, each graph including one curve labeled as "$w_{min}$ corner" showing relative error of model corner value compared to statistical corner value when optimal 3σ resistance corner model for minimum design wire width $w_{min}$ is applied to all wire widths, and additional curves showing relative error of model corner value compared to statistical corner value when an embodiment of the invention is applied. Each of FIGS. 4-9 corresponds to a particular $\phi_0$ value. For example, FIG. 4 corresponds to $\phi_0=10$, FIG. 5 corresponds to $\phi_0=20$, FIG. 6 corresponds to $\phi_0=30$, FIG. 7 corresponds to $\phi_0=40$, FIG. 8 corresponds to $\phi_0=50$, and FIG. 9 corresponds to $\phi_0=60$. Each of FIGS. 4-9 illustrates a first curve denoted as "$w_{min}$ corner", wherein $w_{min}$ corner represents using optimal 3σ resistance corner model for minimum design width $w_{min}$ to all wire widths. Each of FIGS. 4-9 further illustrates additional curves for an embodiment of the invention, wherein each additional curve corresponds to a particular θ value. As shown in FIGS. 4-9, unlike the relative error for $w_{min}$ corner, relative error for the embodiment of the invention does not exceed 10%. Further, as shown in FIGS. 4-9, relative error for the embodiment of the invention decreases as θ value increases.

Figure 10:
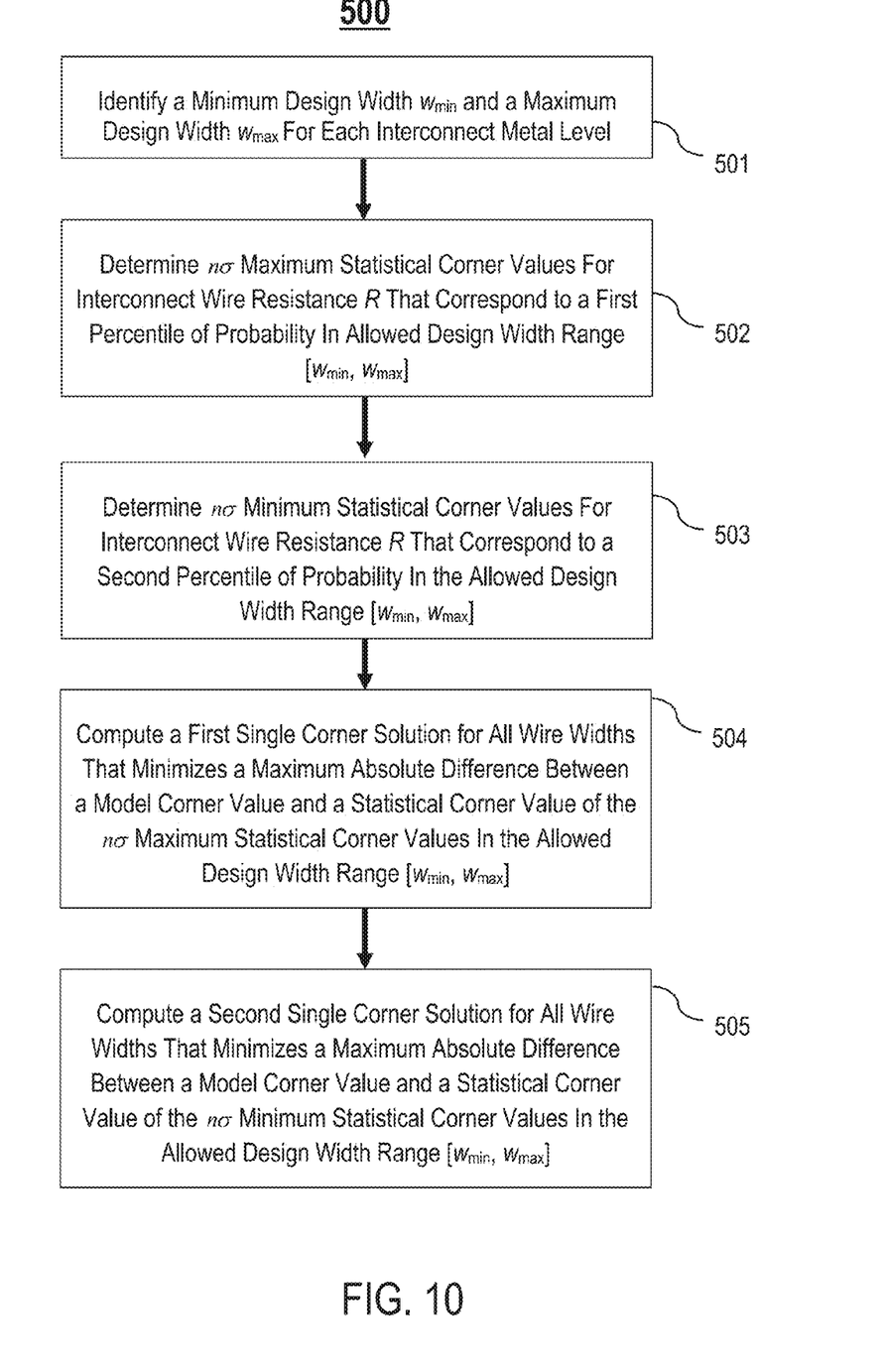
FIG. 10 illustrates an example flowchart for setting $n\sigma$ resistance corner values for three or more wire widths.

FIG. 10 illustrates an example flowchart 500 for setting nσ resistance corner values for three or more wire widths. In process block 501, identify a minimum design width $w_{min}$ and a maximum design width $w_{max}$ for each interconnect metal level. In process block 502, determine nσ maximum statistical corner values for interconnect wire resistance R that correspond to a first percentile of probability in allowed design width range $[w_{min}, w_{max}]$. In process block 503, determine nσ minimum statistical corner values for interconnect wire resistance R that correspond to a second percentile of probability in the allowed design width range $[w_{min}, w_{max}]$. In process block 504, compute a first single corner solution for all wire widths that minimizes a maximum absolute difference between a model corner value and a statistical corner value of the nσ maximum statistical corner values in the allowed design width range $[w_{min}, w_{max}]$. In process block 505, compute a second single corner solution for all wire widths that minimizes a maximum absolute difference between a model corner value and a statistical corner value of the nσ minimum statistical corner values in the allowed design width range $[w_{min}, w_{max}]$.

Figure 11:
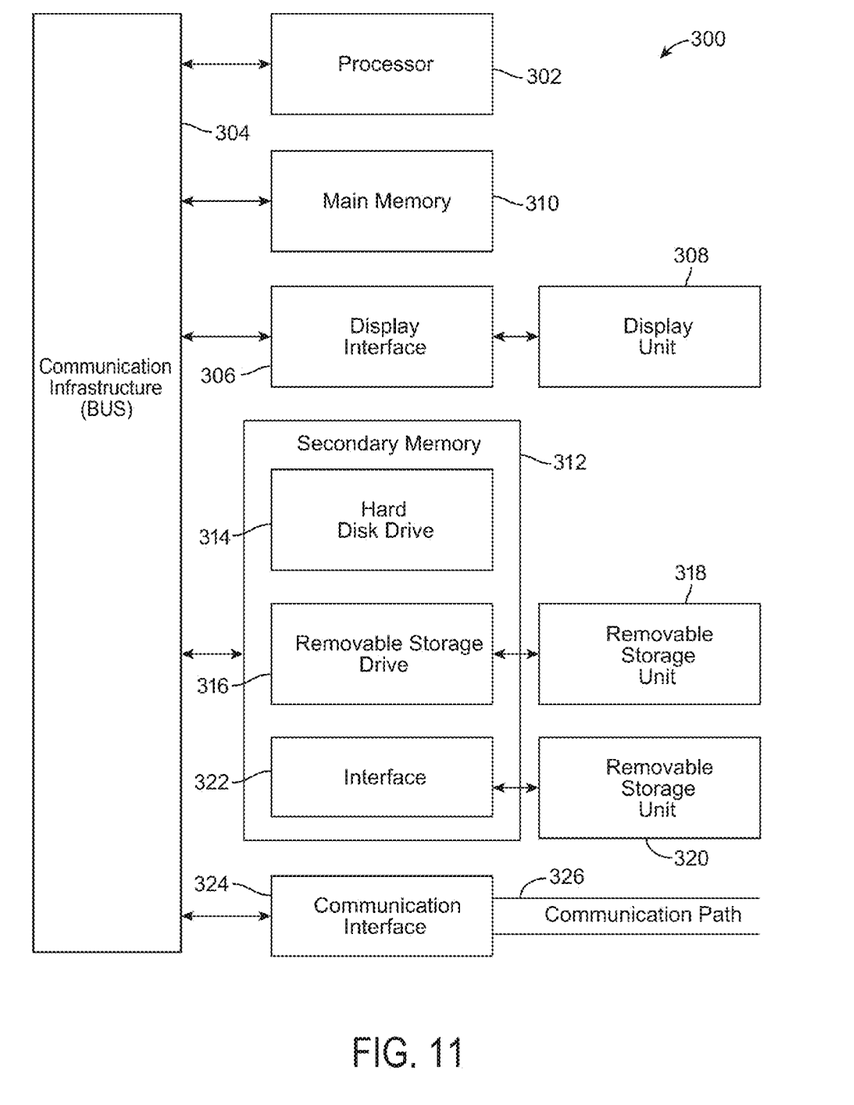
FIG. 11 is a high level block diagram showing an information processing system useful for implementing one embodiment of the invention.

FIG. 11 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of building a wire resistance corner model for an interconnect metal level in a semiconductor device, the method comprising:
   determining a first nominal on-wafer width and a first nominal wire thickness at a minimum design width of the interconnect metal level;
   determining a second nominal on-wafer width and a second nominal wire thickness at a maximum design width of the interconnect metal level;
   determining a first standard deviation and a second standard deviation for global variations in wire thickness and on-wafer width, respectively;
   determining a relation between resistance of the interconnect metal level and on-wafer width and thickness of the interconnect metal level;
   determining a set of maximum statistical corner values for interconnect wire resistance;
   computing a first corner solution that minimizes a first maximum absolute difference between a first model corner value and a first statistical corner value of the set of maximum statistical corner values in the range of the minimum design width and the maximum design width;
   determining a set of minimum statistical corner values for interconnect wire resistance; and
   computing a second corner solution that minimizes a second maximum absolute difference between a second model corner value and a second statistical corner value of the set of minimum statistical corner values in the range of the minimum design width and the maximum design width;
   wherein the semiconductor device is manufactured based on the first corner solution and the second corner solution.

2. The method of claim 1, wherein each corner value for interconnect wire resistance is a corner value for three or more wire widths.

3. The method of claim 1, wherein:
   determining a set of maximum statistical corner values for interconnect wire resistance comprises determining a first on-wafer width corner value and a first wire thickness corner value for calculating a desired maximum resistance corner that corresponds to a first percentile of probability of wire resistance distribution, wherein the first on-wafer width corner value and the first wire thickness corner value minimize the first maximum absolute difference between the first model corner value and the first statistical corner value; and
   determining a set of minimum statistical corner values for interconnect wire resistance comprises determining a second on-wafer width corner value and a second wire thickness corner value for calculating a desired minimum resistance corner that corresponds to a second percentile of probability of wire resistance distribution, wherein the second on-wafer width corner value and the second wire thickness corner value minimize the second maximum absolute difference between the second model corner value and the second statistical corner value.

4. The method of claim 3, wherein determining a relation between resistance of the interconnect metal level and on-wafer width and thickness of the interconnect metal level comprises:
   computing a first sensitivity of wire resistance with regards to on-wafer width at the minimum design width;
   computing a second sensitivity of wire resistance with regards to wire thickness at the minimum design width;
   computing a third sensitivity of wire resistance with regards to on-wafer width at the maximum design width; and
   computing a fourth sensitivity of wire resistance with regards to wire thickness at the maximum design width.

5. The method of claim 1, wherein:
   wire thickness of the interconnect metal level is either a constant or a weak function of on-wafer width;
   resistivity of the interconnect metal level is either a constant or a weak function of on-wafer width and wire thickness.

6. The method of claim 1, wherein:
   the set of maximum statistical corner values corresponds to a first percentile of probability of wire resistance distribution; and
   the set of minimum statistical corner values corresponds to a second percentile of probability of wire resistance distribution.

7. The method of claim 6, wherein:
   the first percentile of probability is one of 99.865%, 99%, 97.5%, 95% or 90%; and
   the second percentile of probability is one of 0.135%, 1%, 2.5%, 5% or 10%.

8. The method of claim 6, further comprising:
   determining a first value based on the first percentile of probability and the second percentile of probability.

9. The method of claim 4, further comprising:
   determining a first angle value based on the first standard deviation, the second standard deviation, the first sensitivity of wire resistance, and the second sensitivity of wire resistance; and
   determining a second angle value based on the first standard deviation, the second standard deviation, the third sensitivity of wire resistance, and the fourth sensitivity of wire resistance.

10. The method of claim 9, further comprising:
    determining the first on-wafer width corner value and the first wire thickness corner value based on the first angle value and the second angle value; and
    determining the second on-wafer width corner value and the second wire thickness corner value based on the first angle value and the second angle value.

11. A system comprising a computer processor, a computer-readable hardware storage medium, and program code embodied with the computer-readable hardware storage medium for execution by the computer processor to implement a method of building a wire resistance corner model for an interconnect metal level in a semiconductor device, the method comprising:
    determining a first nominal on-wafer width and a first nominal wire thickness at a minimum design width of the interconnect metal level;
    determining a second nominal on-wafer width and a second nominal wire thickness at a maximum design width of the interconnect metal level;
    determining a first standard deviation and a second standard deviation for global variations in wire thickness and on-wafer width, respectively;
    determining a relation between resistance of the interconnect metal level and on-wafer width and thickness of the interconnect metal level;

determining a set of maximum statistical corner values for interconnect wire resistance;

computing a first corner solution that minimizes a first maximum absolute difference between a first model corner value and a first statistical corner value of the set of maximum statistical corner values in the range of the minimum design width and the maximum design width;

determining a set of minimum statistical corner values for interconnect wire resistance; and computing a second corner solution that minimizes a second maximum absolute difference between a second model corner value and a second statistical corner value of the set of minimum statistical corner values in the range of the minimum design width and the maximum design width;

wherein the semiconductor device is manufactured based on the first corner solution and the second corner solution.

12. The system of claim 11, wherein each corner value for interconnect wire resistance is a corner value for three or more wire widths.

13. The system of claim 11, wherein:
determining a set of maximum statistical corner values for interconnect wire resistance comprises determining a first on-wafer width corner value and a first wire thickness corner value for calculating a desired maximum corner that corresponds to a first percentile of probability of wire resistance distribution, wherein the first on-wafer width corner value and the first wire thickness corner value minimize the first maximum absolute difference between the first model corner value and the first statistical corner value; and determining a set of minimum statistical corner values for interconnect wire resistance comprises determining a second on-wafer width corner value and a second wire thickness corner value for calculating a desired minimum corner that corresponds to a second percentile of probability of wire resistance distribution, wherein the second on-wafer width corner value and the second wire thickness corner value minimize the second maximum absolute difference between the second model corner value and the second statistical corner value.

14. The system of claim 11, wherein:
wire thickness of the interconnect metal level is either a constant or a weak function of on-wafer width; and
resistivity of the interconnect metal level is either a constant or a weak function of on-wafer width and wire thickness.

15. The system of claim 11, wherein:
the set of maximum statistical corner values corresponds to a first percentile of probability of wire resistance distribution; and
the set of minimum statistical corner values corresponds to a second percentile of probability of wire resistance distribution.

16. The system of claim 15, wherein:
the first percentile of probability is one of 99.865%, 99%, 97.5%, 95% or 90%; and
the second percentile of probability is one of 0.135%, 1%, 2.5%, 5% or 10%.

17. The system of claim 13, wherein determining a relation between resistance of the interconnect metal level and on-wafer width and thickness of the interconnect metal level comprises:

computing a first sensitivity of wire resistance with regards to on-wafer width at the minimum design width;
computing a second sensitivity of wire resistance with regards to wire thickness at the minimum design width;
computing a third sensitivity of wire resistance with regards to on-wafer width at the maximum design width; and
computing a fourth sensitivity of wire resistance with regards to wire thickness at the maximum design width.

18. The system of claim 17, wherein the method further comprises:
determining a first angle value based on the first standard deviation, the second standard deviation, the first sensitivity of wire resistance, and the second sensitivity of wire resistance; and
determining a second angle value based on the first standard deviation, the second standard deviation, the third sensitivity of wire resistance, and the fourth sensitivity of wire resistance.

19. The system of claim 18, wherein the method further comprises:
determining the first on-wafer width corner value and the first wire thickness corner value based on the first angle value and the second angle value; and
determining the second on-wafer width corner value and the second wire thickness corner value based on the first angle value and the second angle value.

20. A computer program product comprising a computer-readable hardware storage medium having program code embodied therewith, the program code being executable by a computer to implement a method of building a wire resistance corner model for an interconnect metal level in a semiconductor device, the method comprising:
determining a first nominal on-wafer width and a first nominal wire thickness at a minimum design width of the interconnect metal level;
determining a second nominal on-wafer width and a second nominal wire thickness at a maximum design width of the interconnect metal level;
determining a first standard deviation and a second standard deviation for global variations in wire thickness and on-wafer width, respectively;
determining a relation between resistance of the interconnect metal level and on-wafer width and thickness of the interconnect metal level;
determining a set of maximum statistical corner values for interconnect wire resistance;
computing a first corner solution that minimizes a first maximum absolute difference between a first model corner value and a first statistical corner value of the set of maximum statistical corner values in the range of the minimum design width and the maximum design width;
determining a set of minimum statistical corner values for interconnect wire resistance; and
computing a second corner solution that minimizes a second maximum absolute difference between a second model corner value and a second statistical corner value of the set of minimum statistical corner values in the range of the minimum design width and the maximum design width;
wherein the semiconductor device is manufactured based on the first corner solution and the second corner solution.

* * * * *